United States Patent
Thomson et al.

(10) Patent No.: US 10,362,167 B2
(45) Date of Patent: Jul. 23, 2019

(54) PROXIMITY BASED INTERACTIONS WITH WALLBOARDS

(71) Applicant: Avaya, Inc., Basking Ridge, NJ (US)

(72) Inventors: Rodney A. Thomson, Westminster, CO (US); Brian J. Reynolds, Firestone, CO (US)

(73) Assignee: Avaya Inc., Basking Ridge, NJ (US)

( * ) Notice: Subject to any disclaimer, the term of this patent is extended or adjusted under 35 U.S.C. 154(b) by 1666 days.

(21) Appl. No.: 13/922,346

(22) Filed: Jun. 20, 2013

(65) Prior Publication Data

US 2014/0379587 A1 Dec. 25, 2014

(51) Int. Cl.
| H04L 29/08 | (2006.01) |
| H04L 29/06 | (2006.01) |
| H04L 12/58 | (2006.01) |
| G06Q 50/00 | (2012.01) |
| H04M 3/51 | (2006.01) |
| G06Q 10/10 | (2012.01) |

(52) U.S. Cl.
CPC .............. H04M 3/51 (2013.01); G06Q 10/10 (2013.01); *H04M 2203/402* (2013.01)

(58) Field of Classification Search
CPC combination set(s) only.
See application file for complete search history.

(56) References Cited

U.S. PATENT DOCUMENTS

| 8,396,732 | B1* | 3/2013 | Nies ..................... G06Q 30/02 705/7.12 |
| 9,349,118 | B2* | 5/2016 | Chavez ................ G06Q 10/101 |
| 2003/0229900 | A1* | 12/2003 | Reisman .......... G06F 17/30873 725/87 |
| 2005/0021369 | A1* | 1/2005 | Cohen .................. G06F 19/327 705/2 |
| 2010/0235218 | A1 | 9/2010 | Erhart et al. |
| 2010/0296417 | A1 | 11/2010 | Steiner |
| 2011/0125793 | A1 | 5/2011 | Erhart et al. |
| 2011/0125826 | A1 | 5/2011 | Erhart et al. |
| 2011/0255683 | A1 | 10/2011 | Flockhart et al. |
| 2012/0069986 | A1* | 3/2012 | Edholm .............. H04M 3/2281 379/265.06 |
| 2013/0282438 | A1* | 10/2013 | Hunter ..................... G01S 1/02 705/7.32 |
| 2014/0282068 | A1* | 9/2014 | Levkovitz ............ G06Q 20/223 715/748 |

\* cited by examiner

*Primary Examiner* — Mark A Fleischer
(74) *Attorney, Agent, or Firm* — Sheridan Ross P.C.

(57) ABSTRACT

Proximity-based interactions with wallboards and mobile devices create an interactive and effective communication model, efficiently utilizing space and opportunities for communication between a contact center and its agents and supervisors. The system provides a dynamic, proximity-based location service including displays for agents and real-time message capabilities for supervisors.

20 Claims, 8 Drawing Sheets

PROXIMITY BASED INTERACTIONS WITH WALLBOARDS

FIELD OF THE DISCLOSURE

The present disclosure is generally directed toward communications and more specifically toward contact centers.

BACKGROUND

Large wallboard displays in contact centers are not customized to audiences with variable viewing ranges, thereby making effectiveness of the wallboard questionable in large contact centers. Also, valuable resolution and display space is wasted to make the display useful to those at far distances, regardless of the dynamic nature of the audience and the distance from the largest number of actual viewers.

Wallboards currently display a feed that includes a fraction of available and actionable data. The wallboards typically time slice the data or filter the data based on need for a critical response. Slicing and filtering data reduces the value of the wallboard since the data is presented to everyone in the contact center, including agents and supervisors who may not understand the data, be permitted to take action, or be required to take action. This problem also exists in virtual reality environments (VREs) where information is posted on walls without fine-tuning for users present in the VRE.

Additionally, wallboards provide status on contact center performance, the agents, or information important to the general audience of the location/company. The usefulness of the wallboards is limited to the data presented at a particular moment and for a particular audience. It would be advantageous for agents and supervisors to have direct interaction with the system, including the ability to send queries, to change the display, to post targeted information, and to find agents and/or supervisors for whom the data is relevant.

SUMMARY

These and other needs are addressed by the various aspects, embodiments, and/or configurations of the present disclosure. The present disclosure is directed to a contact center wallboard display system that can allow agent and/or supervisor interactions using smart devices, thereby allowing supervisors to push component display information to wallboards in proximity to certain agents and/or groups, allowing a new level of efficiency on the contact center floor and further increasing the usefulness of the wallboard to the entire contact center floor.

With the introduction of smart devices, the wallboard display system allows viewers of a wallboard to interact with the wallboard. To enhance the usefulness of the data presented, one feature can include the ability for viewers to request information on a particular element of the contact center that is pertinent to them, process this request, and have this information presented on the nearest wallboard for consumption. As a result, the wallboard can be used for faster course correction and processing than could be done on a smart device or shown on a standard wallboard with a rich site summary (RSS) feed.

A Global Positioning System (GPS) enabled display system can detect where agents are and determine which wallboard is closest to those agents. The agents would also be able to use an application on a smart device and/or on a web page to request information from the system. The system would determine the closest wallboard to a requesting agent, and post the relevant data to that wallboard. The GPS-enabled system would additionally allow supervisors to push relevant information to the displays based on the location of his or her agents.

For example, Mark would like information on the queue/skill targets including counts, alerts, etc. when he comes in during shift change. He takes out his smartphone, opens the application, and puts in a request. The system detects his location, and it displays the requested information on wallboard display 7, closest to Mark's desk based on the GPS in his smartphone.

In an additional example, Maynard the supervisor takes a walk around the floor, carrying his iPad. He is running an instance of Avaya Aura® Performance Center Mobile for Supervisors, an application that allows a supervisor to roam a contact center floor while tracking and managing agents and queues. Maynard is able to review and provide component display based on agent performance and other Key Performance Indicators (KPIs), thresholds, availability, etc. As Maynard passes each group, he uses the application to push information on display 1 for queue/skill 6 and to push information on display 2 on the other side of the room for queue/skill 8 as they are nearing warning levels for two KPIs. The agents see the displays managed by Maynard, and they respond appropriately to course-correct the lagging indicators.

In additional embodiments, location of the agents and/or supervisors may be done with radio-frequency identification (RFID), a human microchip implant, or other tracking devices in addition to the GPS option discussed previously.

These and other advantages will be apparent from the disclosure.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any storage and/or transmission medium that participate in providing instructions to a processor for execution. Such a medium is commonly tangible and non-transient and can take many forms, including but not limited to, non-volatile media, volatile media, and transmission media and includes without limitation random access memory ("RAM"), read only memory ("ROM"), and the like. Non-volatile media includes, for example, NVRAM, or magnetic or optical disks. Volatile media includes dynamic memory, such as main memory. Common forms of computer-readable media include, for example, a floppy disk (including without limitation a Bernoulli cartridge, ZIP drive, and JAZ drive), a flexible disk, hard disk, magnetic tape or cassettes, or any other magnetic medium, magneto-optical medium, a digital video disk (such as CD-ROM), any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. Computer-readable storage medium commonly excludes transient storage media, particularly electrical, magnetic, electromagnetic, optical, magneto-optical signals.

The term "user," "customer," or "client" denotes a party patronizing, serviced by, or otherwise doing business with a contact center and/or an enterprise business.

A "database" as used herein refers to an organized set of data held in a computer. The organization schema or model for the data can, for example, be hierarchical, network, relational, entity-relationship, object, document, XML, entity-attribute-value model, star schema, object-relational, associative, multidimensional, multi-value, semantic, and other database designs.

The terms "determine," "calculate," and "compute," and variations thereof as used herein, are used interchangeably and include any type of methodology, process, mathematical operation or technique.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "module" as used herein refers to any known or later developed hardware, software, firmware, artificial intelligence, fuzzy logic, or combination of hardware and software that is capable of performing the functionality associated with that element. Also, while the disclosure is presented in terms of exemplary embodiments, it should be appreciated that individual aspects of the disclosure can be separately claimed.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

DETAILED DESCRIPTION

Figure 1:
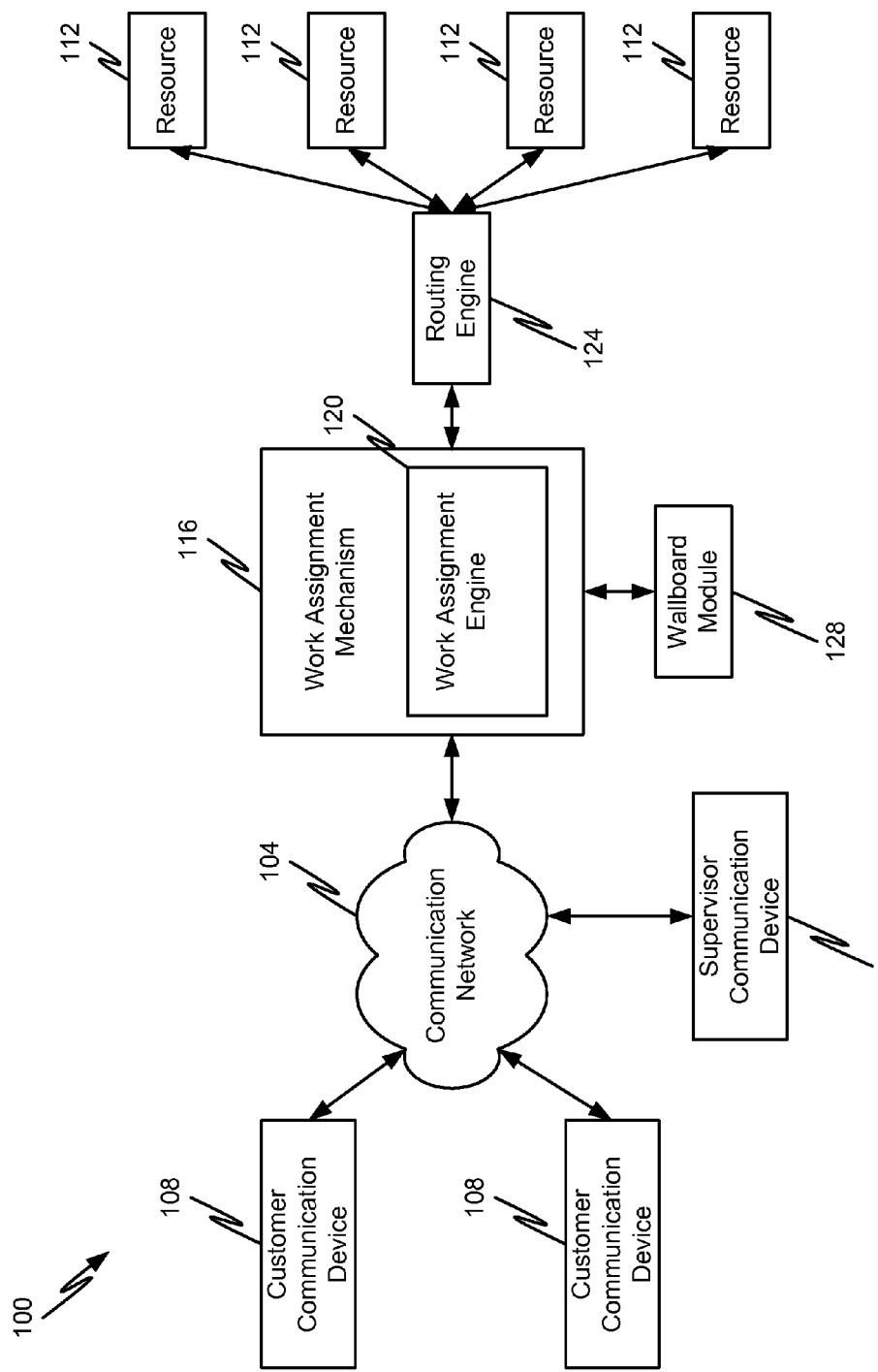
FIG. 1 is a block diagram of a communication system in accordance with embodiments of the present disclosure.

FIG. 1 shows an illustrative embodiment of a communication system 100 in accordance with at least some embodiments of the present disclosure. The communication system 100 may be a distributed system and, in some embodiments, comprises a communication network 104 connecting one or more customer communication devices 108 and one or more supervisor communication devices 132 to a work assignment mechanism 116, which may be owned and operated by an enterprise administering a contact center in which a plurality of resources 112 are distributed to handle incoming work items from the customer communication devices 108 and may be managed with the use of a supervisor communication device 132.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes and Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Voice over Internet Protocol (VoIP) network, a Session Initiation Protocol (SIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. patent application Ser. No. 12/469,523 to Steiner, the entire contents of which are hereby incorporated herein by reference. Moreover, the communication network 104 may comprise a number of different communication media such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize the communication device 108 to initiate a work item, which is generally a request for a processing resource 112. Exemplary work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication. An example of such a harvested communication includes a social media communication that is harvested by the work assignment mechanism 116 from a social media network or server. Exemplary architectures for harvesting social media communications and generating work items based thereon are described in U.S. patent application Ser. Nos. 12/784,369, 12/706,942, and 12/707,277, filed Mar. 20, 1010, Feb. 17, 2010, and Feb. 17, 2010, respectively, each of which are hereby incorporated herein by reference in their entirety.

The communication device 132 may correspond to supervisor communication device or collection of devices. In accordance with at least some embodiments of the present disclosure, a supervisor may utilize the communication device 132 to evaluate or help the handling of the work item by a resource 112. The supervisor may utilize the communication device 108 to initiate or respond to interaction regarding work items with the work assignment mechanism 116, a wallboard module 128, elements within or outside of the communication network 104, and to processing resources 112.

The format of the work item may depend upon the capabilities of the communication device 108 and the format of the communication. In particular, work items are logical representations within a contact center of work to be performed in connection with servicing a communication received at the contact center (and more specifically the work assignment mechanism 116). The communication may be received and maintained at the work assignment mechanism 116, a switch or server connected to the work assignment mechanism 116, or the like until a resource 112 is assigned to the work item representing that communication at which point the work assignment mechanism 116 passes the work item to a routing engine 124 to connect the communication device 108 to the assigned resource 112.

Although the routing engine 124 is depicted as being separate from the work assignment mechanism 116, the routing engine 124 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, tablet, cellular phone, smartphone, telephone, or combinations thereof. In general, each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 124. The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact centers.

As discussed above, the work assignment mechanism 116 and resources 112 may be owned and operated by a common entity in a contact center format. In some embodiments, the work assignment mechanism 116 may be administered by multiple enterprises, each of which has their own dedicated resources 112*a-n* connected to the work assignment mechanism 116.

In some embodiments, the work assignment mechanism 116 comprises a work assignment engine 120 which enables the work assignment mechanism 116 to make intelligent routing decisions for work items. In some embodiments, the work assignment engine 120 is configured to administer and make work assignment decisions in a queueless contact center, as is described in U.S. patent application Ser. No. 12/882,950, the entire contents of which are hereby incorporated herein by reference.

More specifically, the work assignment engine 120 can determine which of the plurality of processing resources 112 is qualified and/or eligible to receive the work item and further determine which of the plurality of processing resources 112 is best suited (or is the optimal processing resource) to handle the processing needs of the work item. In situations of work item surplus, the work assignment engine 120 can also make the opposite determination (i.e., determine optimal assignment of a work item resource to a resource). In some embodiments, the work assignment engine 120 is configured to achieve true one-to-one matching by utilizing bitmaps/tables and other data structures.

The work assignment mechanism 116 can communicate with the wallboard module 128 which may attempt to detect presence and/or location of, display data for, and respond to supervisors 212 and processing resources 112 in the contact center.

Figure 2:
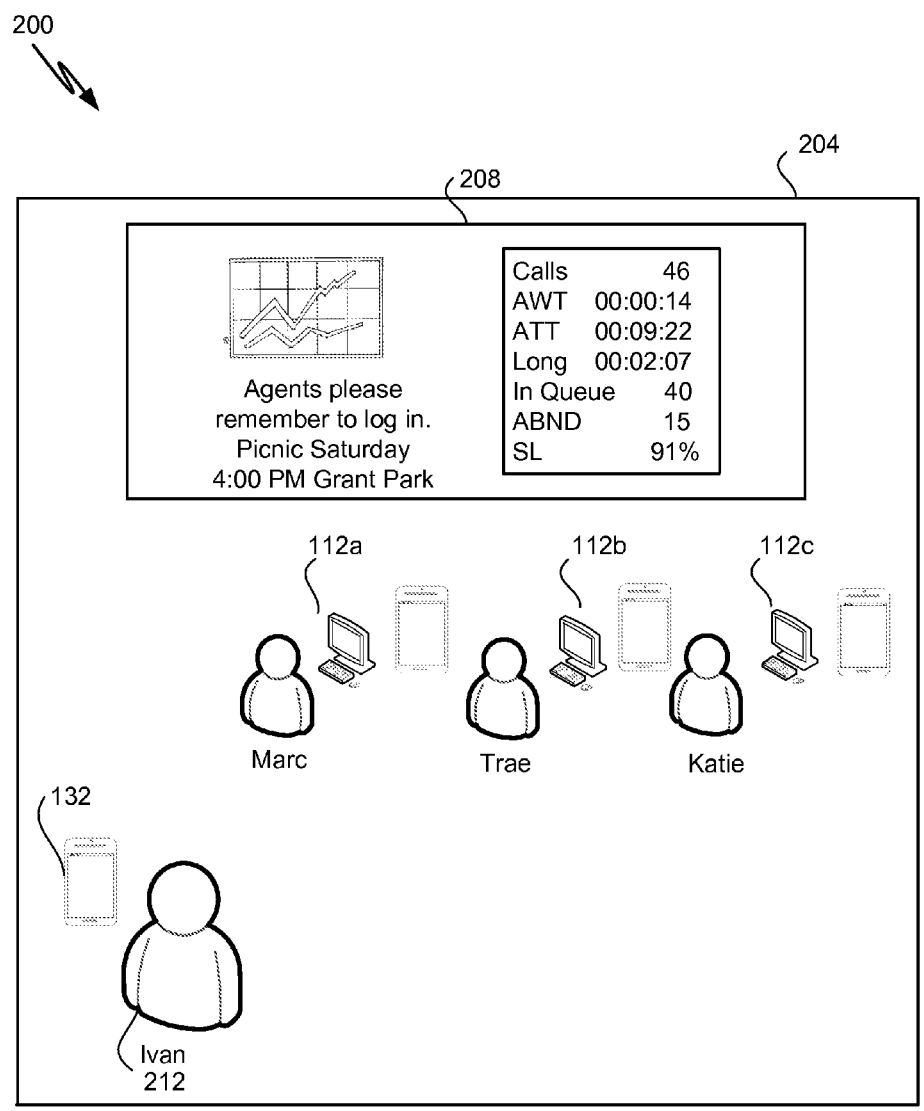
FIG. 2 is an example of a contact center floor with supervisor-controlled display in accordance with embodiments of the present disclosure.

FIG. 2 depicts a contact center 200 in accordance with embodiments of the present disclosure. The phrase "contact center" as used herein refers to a company that manages client correspondence through a variety of mediums, including telephone, fax, email, mail, chat, text, etc. A contact center "floor" 204 typically contains resources 112, one or more supervisors 212, and large, wall-mounted Light Emitting Diode (LED) displays 208.

The contact center floor 204 can contain one or more large, wall-mounted displays, commonly referred to as wallboards 208, operable to integrate with data sources. The wallboard 208 may display many types of information, including but not limited to, RSS feed data, statistics (e.g., KPIs), metrics, graphs, images, announcements, alerts, thresholds, and messages. The contact center 200 can include more or fewer elements, and elements of the contact center 200 can be arranged differently and interact differently than those shown in FIG. 2.

Contact center resources may be agents 112 at workstations and may be seated with a view of one or more wallboards 208. Generally, the agent 112 can have a workstation that includes a telephone, a computer, a smart device, and other communication devices. As can be appreciated, the contact center floor 204 and the agent 112 workstations may comprise more or fewer of the elements listed. One or more supervisors 212 may be available to monitor activities on the contact center floor 204 and to assist, restrain, and train agents 112.

In a preferred embodiment, the supervisor 212 may have a smart communication device 132. A smart device is a communication device that generally is mobile, cordless, connected via wireless/3G/4G, and capable of browsing, telephony, and geo-location. The smart device may be a telephone or a tablet. The supervisor communication device 132 may be a telephone or tablet, operable to run applications related to the supervision of the contact center floor 204. The supervisor communication device 132 may be operable to receive calls, short message service (SMS) texts, pop-ups, and data as well as operable to communicate with a wallboard module 128 and other contact center 200 elements.

Figure 3:
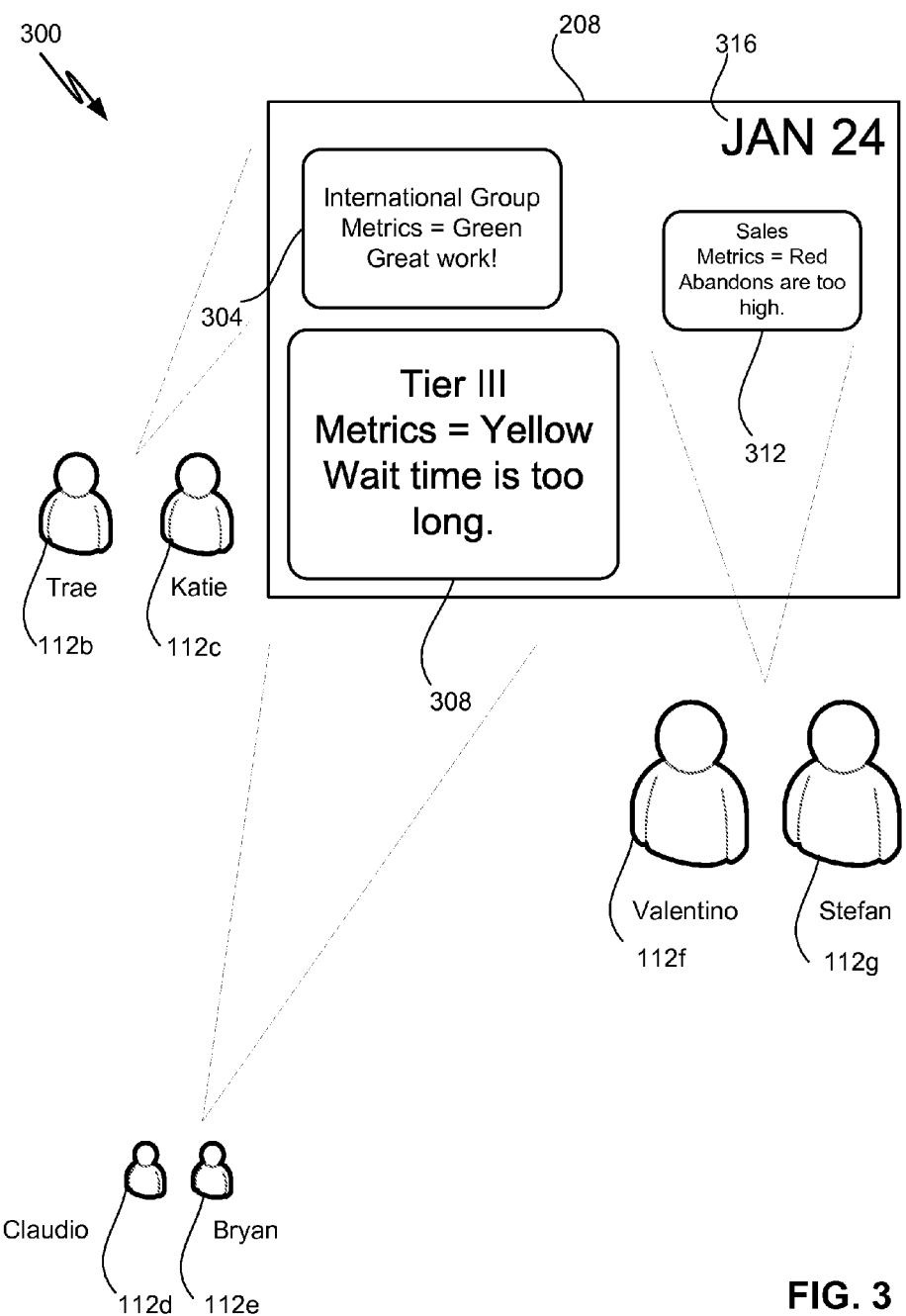
FIG. 3 is an example of a visual proximity wallboard display in accordance with embodiments of the present disclosure.

Referring to FIG. 3, an example of a visual proximity wallboard display 300 for multiple sets of agents 112 is shown. Generally, on a contact center floor 204, groups of agents 112 may sit at varying distances from the wallboard display 208.

When an agent 112 logs in, a Global Positioning System (GPS) enabled display system 208 can detect where the agent 112 is physically sitting and determine which wallboard 208 can best display relevant information to the agent 112. In some embodiments, the determination of which wallboard 208 is best for an agent 112 may include considerations such as which wallboard 208 is closest to the agent 112 and/or which wallboard 208 is most easily viewed by the agent. The closest wallboard 208 may not always be the best wallboard for an agent 112 if it is around a corner, obstructed from view by another object, etc. Relevant data may be posted to the wallboard 208 in a resolution determined to be optimal for the distance. The GPS-enabled system may give supervisors the option to push relevant data to the wallboard 208 based on the physical location of his or her agents 112.

For example, a Sales Group, including Valentino 112*f* and Stefan 112*g*, may sit five feet from a large, wall-mounted display 208. An International Group, including Trae 112*b* and Katie 112*c*, may sit ten feet from a large, wall-mounted display 208. A Tier III Group, including Claudio 112*d* and Bryan 112*e*, may sit fifteen feet from a large, wall-mounted display 208. The display data 304 for Trae 112*b* and Katie 112*c* (and additional members of the International Group) may be moderately sized since agents 112 in the group are ten feet from the wallboard 208. The display data 308 for Claudio 112*d* and Bryan 112*e* (and additional members of the Tier III Group) may be relatively large sized since agents 112 in the group are fifteen feet from the wallboard 208. The display data 312 for Valentino 112*f* and Stefan 112*g* (and additional members of the Sales Group) may be significantly smaller than for the International and Tier III Groups since agents 112 are only five feet from the wallboard 208.

Additionally, Ivan 212 the supervisor can customize the display data 304, 308, 312 for one or more groups of agents 112. Display data may be automatically generated and displayed (e.g., from an automatic call distributer—ACD) like the date 316 (e.g., JAN 24) and/or manually entered and displayed (e.g., from the supervisor). The International Group's display data 304 might display metrics and/or status, with examples like, "Metrics=Green" and "Great work!" The Tier III Group's display data 308 might display metrics and/or status, with examples like, "Metrics=Yellow" and "Wait time is too long." The Sales Group's display data 312 might display metrics and/or status, with examples like, "Metrics=Red" and "Abandons are too high." As can be understood from the example data displays 304, 308, 312, each group may have a display specific to agents 112 in the group. Data displays 304, 308, 312 for additional groups could be identical or distinctly different from other data displays 304, 308, 312. General information 316 may be displayed with a size that can be seen by all agents 112 on the contact center floor 204.

Figure 4:
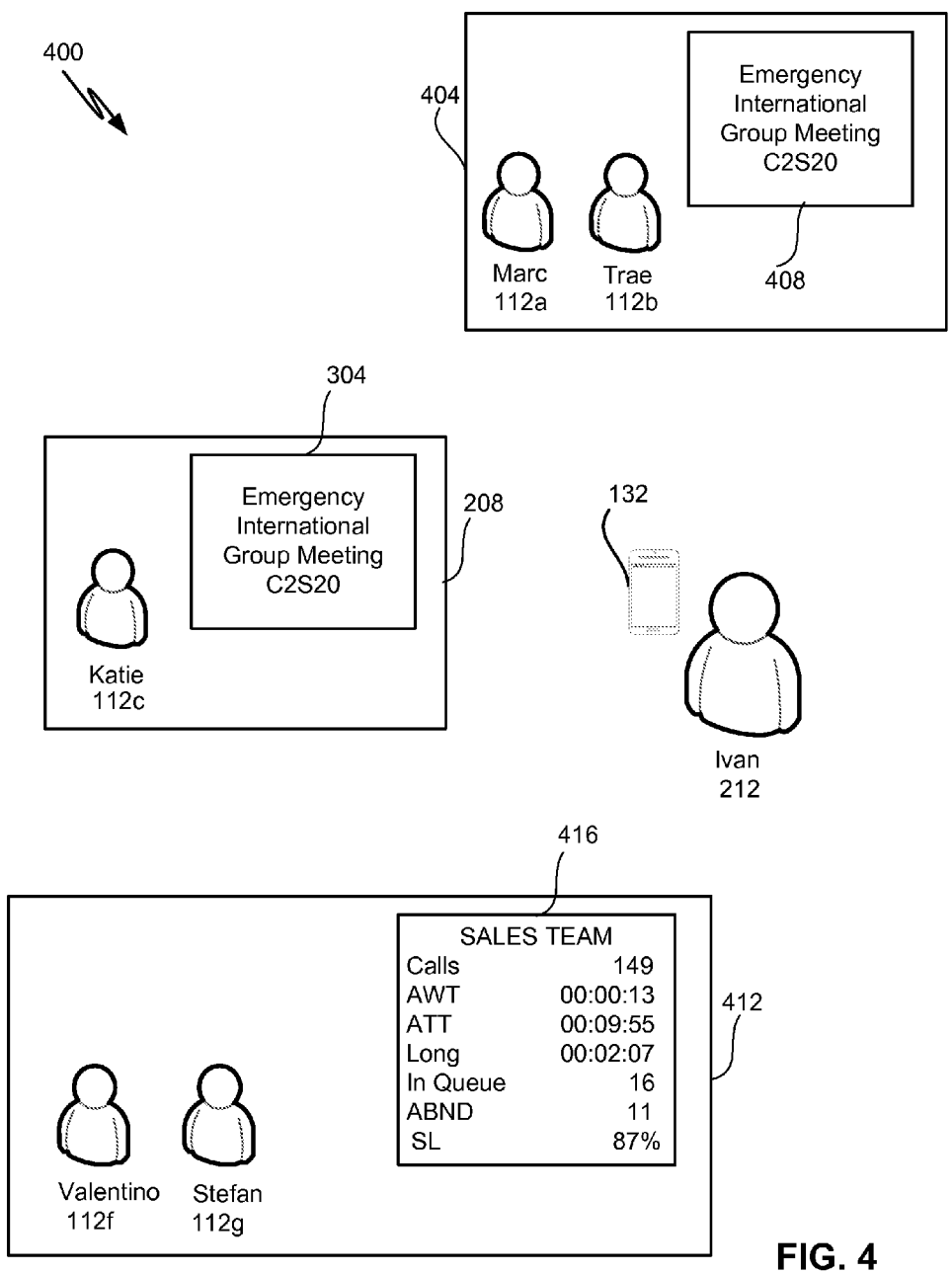
FIG. 4 are examples of location-based wallboard messaging displays in accordance with embodiments of the present disclosure.

Referring now to FIG. 4, examples of location-based wallboard messaging displays 400 are shown. Generally, a contact center may contain one or more wallboards. The wallboards 404, 208, 412 may be located on different walls of the contact center floor 204 and/or located in different rooms within the contact center 200, operable to receive information from a smart device 132 from a supervisor 212.

For example, Ivan the supervisor 212 has an application on his smart device 132. The application allows Ivan 212 to push information to one or more wallboards in the contact center. A very large earthquake has occurred in Japan where the company has a satellite contact center. Ivan 212 is contacted by the supervisor from the satellite location, notifying him that the facility is in shambles. The supervisor asks Ivan 212 if his teams can help if he can redirect the communications for handling. It is critically important that Ivan 212 find all available qualified agents 112 as quickly as possible so that he can brief agents 112 on the situation. Once briefed, agents 112 can accept work from the crippled satellite contact center. Rather than running around to find agents 112 who can be available to take work, Ivan 212 opens up the application on his smart device 132. He pushes a message, "Emergency International Group Meeting C2S20." The wallboard module 128 may know where agents 112 are based on GPS, RFID, or other location indicators and display the message accordingly. A wallboard 408 in a break room 404 may display the message "Emergency International Group Meeting C2S20" since Trae 112*b* from the International Group is within detectable vicinity of the wallboard 408. The wallboard 208 on the contact center floor 204 may display the message "Emergency International Group Meeting C2S20" with a medium data display 304 since Katie 112*c* is at her desk and within detectable vicinity of the wallboard 208. A wallboard 416 may not display the message "Emergency International Group Meeting C2S20" in a conference room 412 since Valentino 112*f* and Stefan 112*g* are not part of the available and qualified agents 112 who can help with the work from the satellite contact center. The wallboard module 128 may keep the current data display 416 that is relevant to the Sales Group. The agents 112 see the message in the break room 404 and on the contact center floor 204, and immediately proceed to a meeting room. After the brief, the agents 112 respond appropriately to the surge of incoming work.

Figure 5:
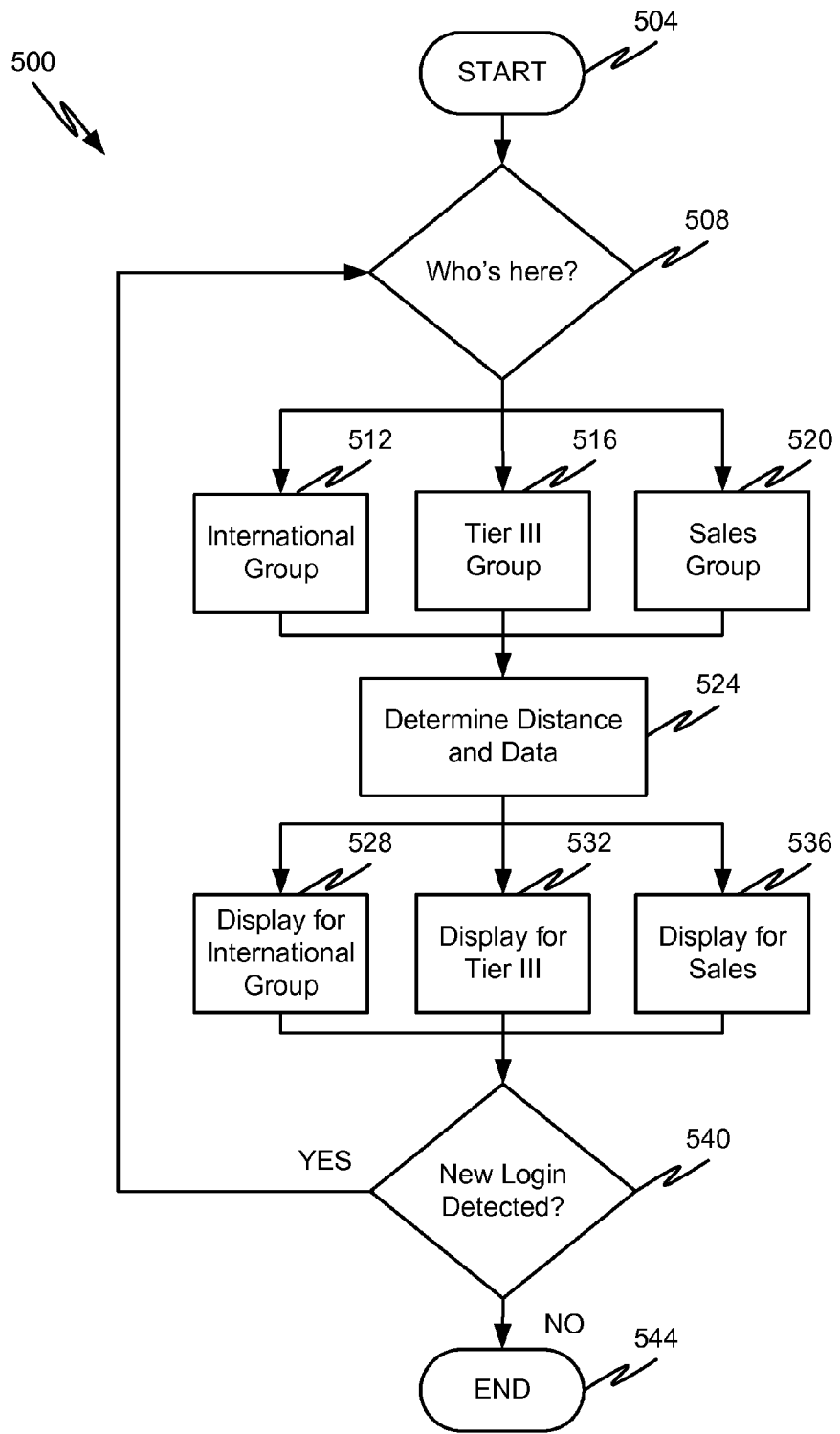
FIG. 5 depicts a flow diagram for display determination in accordance with embodiments of the present disclosure.

The method 500 for display determination in accordance with embodiments of the present disclosure is shown in FIG. 5. Generally, the method 500 begins with a start operation 504 and terminates with an end operation 544. While a general order for the steps of the method 500 are shown in FIG. 5, the method 500 can include more or fewer steps or the order of the steps can be arranged differently than those shown in FIG. 5. The method 500 can be executed as a set of computer-executable instructions executed by a computer system and encoded or stored on a computer readable medium. Further, the method may also be embodied by a set of gates or other structures in an Application Specific Integrated Circuit (ASIC), a Field Programmable Gate Array (FPGA), or other configurable hardware component, module, or system. Hereinafter, the method 500 shall be explained with reference to the systems, components, modules, software, data structures, etc. described in conjunction with FIGS. 1-4.

Typically, the process queries at step 508 to see who may be in the vicinity of the wallboard 208. Many agents 112 assigned to different groups and/or work may be available and detectable. In step 512, agents 112 who work in the International Group and who are logged in may be detected by the wallboard module 128. In step 516, agents 112 who work in the Tier III group and who are logged in may be detected by the wallboard module 128. In step 520, agents 112 who work in the Sales Group and who are logged in may be detected by the wallboard module 128. Agents 112 may be located with RFID, GPS, a human microchip implant, and other tracking and/or locating devices.

The wallboard module 128 may determine an agent's distance from a wallboard 208 and display data 304, 308, 312 that may be displayed on the wallboard 208 closest to the agent 112 with appropriate sizing of the display for the distance, in step 524. In step 528, the wallboard module 128, after determining the relative position of available agents 112 in the International Group, may update the display data 304 appropriately sized and placed for the available agents 112. Concurrently, in step 532, the wallboard module 128, after determining the relative position of available agents 112 in the Tier III Group, may update the display data 308 appropriately sized and placed for the available agents 112. Before, after, or simultaneous with step 528 and step 532, in step 536, the wallboard module 128, after determining the relative position of available agents 112 in the Sales Group, may update the display data 312 appropriately sized and placed for the available agents 112. The wallboard module 128 may continuously monitor the contact center floor 204 for new logins. In step 540, when a new agent 112 login is detected, the wallboard module 128 may begin the process again at step 508. If no new agent 112 logins are detected in step 540, the process may end, at step 544.

Figure 6:
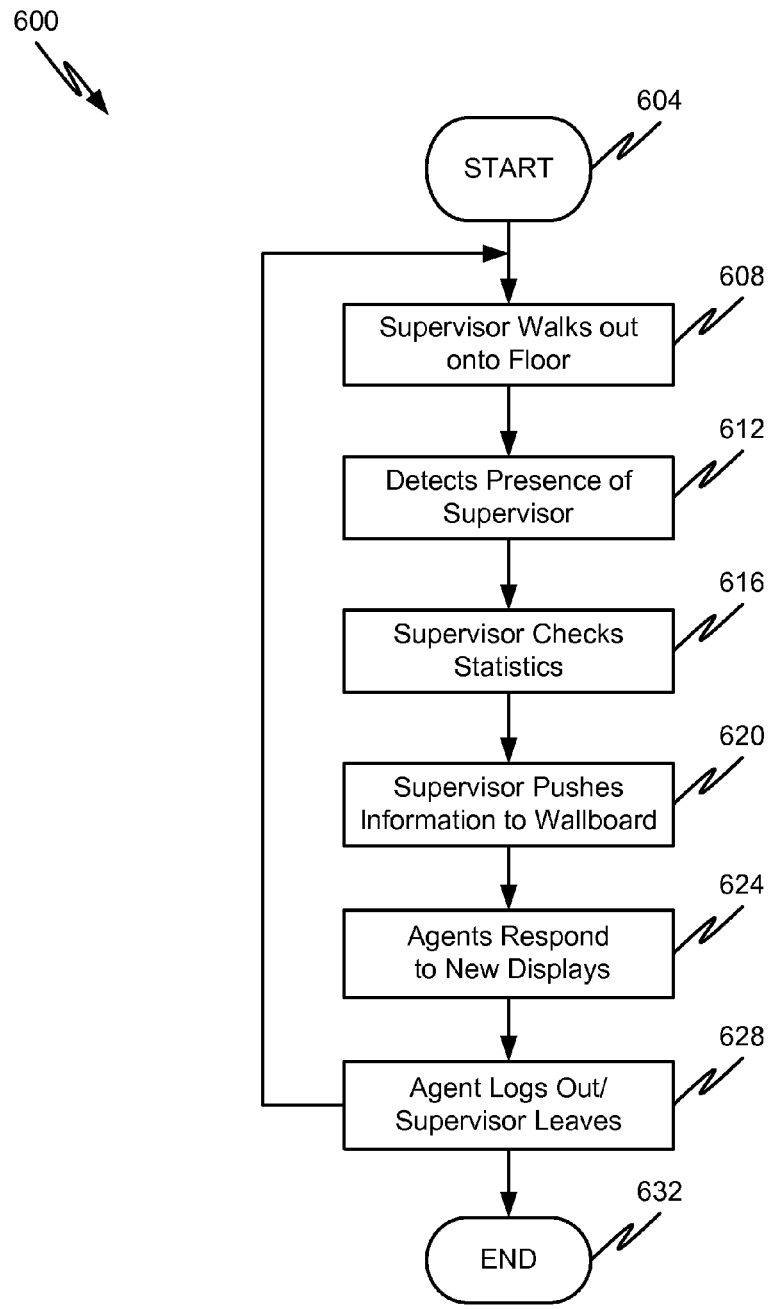
FIG. 6 depicts a flow diagram for a supervisor proximity and push wallboard display method in accordance with embodiments of the present disclosure.

The method 600 for a supervisor proximity and push wallboard display in accordance with embodiments of the present disclosure is shown in FIG. 6. Generally, the method 600 begins with a start operation 604 and terminates with an end operation 632. While a general order for the steps of the method 600 are shown in FIG. 6, the method 600 can include more or fewer steps or the order of the steps can be arranged differently than those shown in FIG. 6. The method 600 can be executed as a set of computer-executable instructions executed by a computer system and encoded or stored on a computer readable medium. Further, the method may also be embodied by a set of gates or other structures in an ASIC, an FPGA, or other configurable hardware component, module, or system. Hereinafter, the method 600 shall be explained with reference to the systems, components, modules, software, data structures, etc. described in conjunction with FIGS. 1-5.

Generally, the process begins when a supervisor steps onto a contact center floor 204, in step 608. As the supervisor 212 comes into the vicinity of a wallboard 208, the wallboard 208 may detect the presence of the supervisor 212 and/or a supervisor's communication device 132, in step 612. The presence of the supervisor 212 and/or the supervisor's communication device 132 may be detectable via login, extension activation, RFID, GPS, a human microchip implant, and/or other tracking devices or presence indicators. As a routine part of a shift, the supervisor 212 may check contact center statistics, in step 616. Typical contact center statistics might include, but are not limited to, Average Call Handle Time (ACHT) which may include total talk time and wrap time divided by the total number of calls, Service Level (SL %) which may indicate the percentage of calls answered within a certain amount of time (e.g., 30 seconds), Abandon Rate (ABN %) which may be the number of dropped calls divided by total incoming calls, Average Speed Answer (ASA) which may be the average number of seconds or minutes it takes to answer a call, Longest Wait Time (LWT) and Average Wait Time (AWT) for incoming calls, and Calls in Queue (CIQ) which may indicate how many calls are pending, waiting for agent 112 handling.

If the supervisor 212 determines that any of the statistics needs adjustment and/or special attention, the supervisor 212 may use the supervisor's communication device 132 to push information to a wallboard module 128. The wallboard module 128 may send data to one or more wallboards 208, in step 620. Data sent to the wallboard 208 may include instructions to agents 112, announcements, warnings, etc. For example, the supervisor 212 may post a message on the wallboard 208 that reads, "The abandon call time is going up. Does anyone need assistance?" Agents 112 within the viewing range and for whom the data push is relevant may take action in step 624 based on the push data on the wallboard 208. Actions by agents 112 might include, but are not limited to, finishing calls in progress to free up agents 112 to take calls in queue, teamwork by agents 112 to answer incoming calls more quickly, more experienced agents 112 may start helping other agents 112, or agents 112 may take other actions to reduce backlog, taking breaks if some agents 112 may be getting tired, and asking for supervisor 212 assistance, if needed. Katie 112c may raise her hand and ask the supervisor 212 what data in a trace might indicate. As the supervisor 212 observes, the statistics generally improve as the supervisor 212 helps and agents 112 respond to the data push from the wallboard module 128. At the end of a shift, in step 628, the agents 112 and the supervisor 212 may log out and leave. The wallboard module 128 may detect that the supervisor 212 and the supervisor's communication device 132 and the agents 112 are no longer in the vicinity and adjust the data display on the wallboard 208 appropriately. The process ends at step 632. As new agents 112 and supervisors 212 come onto the contact center floor 204, the method 600 may begin again.

Figure 7:
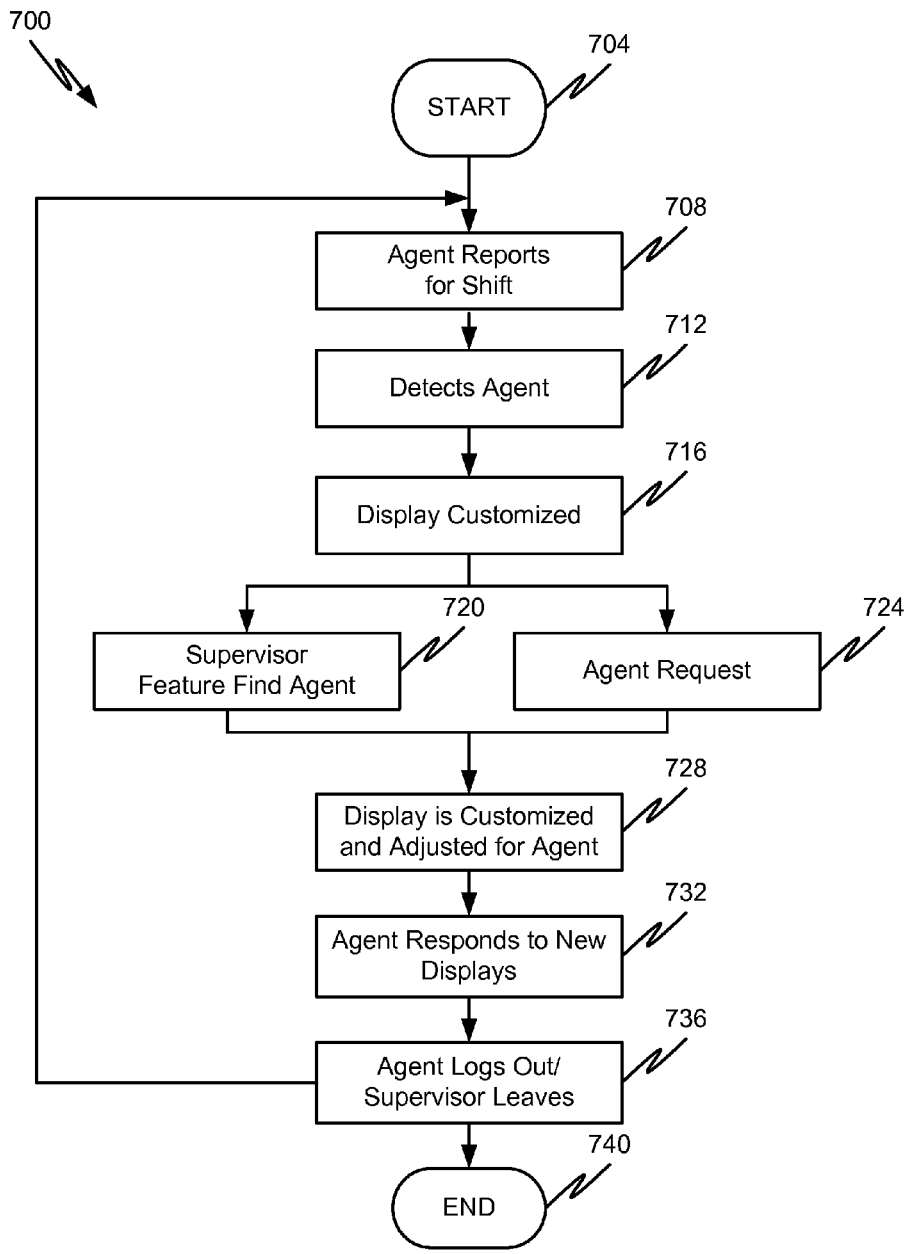
FIG. 7 depicts a flow diagram for an agent proximity and request wallboard display method in accordance with embodiments of the present disclosure.

The method 700 for an agent proximity and request wallboard display in accordance with embodiments of the present disclosure is shown in FIG. 7. Generally, the method 700 begins with a start operation 704 and terminates with an end operation 740. While a general order for the steps of the method 700 are shown in FIG. 7, the method 700 can include more or fewer steps or the order of the steps can be arranged differently than those shown in FIG. 7. The method 700 can be executed as a set of computer-executable instructions executed by a computer system and encoded or stored on a computer readable medium. Further, the method may also be embodied by a set of gates or other structures in an ASIC, an FPGA, or other configurable hardware component, module, or system. Hereinafter, the method 700 shall be explained with reference to the systems, components, modules, software, data structures, etc. described in conjunction with FIGS. 1-6.

Typically, the method begins when an agent 112 arrives at a contact center facility for a shift, in step 708. As the agent 112 comes into the vicinity of a wallboard 208, the wallboard 208 may detect the presence of the agent 112, in step 712. The presence of the agent 112 may be detectable via a login, extension activation, RFID, GPS, a human microchip implant, and/or other tracking devices or presence indicators. Once the agent 112 is detected in step 712, the wallboard 208 may customize the display data for the agent, in step 716. For example, Valentino 112*f* in the Sales Group reports for his shift. A wallboard module 128 may gather and post statistics, metrics, messages, announcements, etc. to the wallboard 208 for the Sales Group, set at a certain text size appropriate for viewing from a workstation where Valentino 112*f* sits.

After a few hours, Valentino 112*f* may go to a break room 404 for a short break. During this time, Valentino's supervisor Ivan 212 may have a surge of calls come into a queue handled by the Sales Group. Instead of walking around the facility looking for agents 112, Ivan 212 may invoke a find agent feature, in step 720. The find agent feature may be invoked via an application on Ivan's communication device 132 and/or via an application on a website. Ivan 212 may be able to "find" all agents 112 in the Sales Group. If Ivan 212 specifically needs Valentino 112*f*, he may walk to the break room 404 to get Valentino 112*f*, and/or Ivan 212 may send a message from the supervisor communication device 132 to the wallboard module 128 to display a message, summoning Valentino 112*f* and potentially other members of the Sales Group back to the contact center floor 204.

Valentino 112*f* in the break room 404 may see a data display message 408 from Ivan 212 that reads, "Queue surge." Before heading back to the contact center floor 204, Valentino 112*f* may send a request to the wallboard module 128 to display queue statistics for the Sales Group, in step 724. The wallboard and/or a communication device may display the requested queue statistics specific to the request from Valentino 112*f*, in step 728. In step 732, Valentino 112*f* may respond to the message from Ivan 212 and return to the contact center floor 204. Valentino 112*f* may be able to jump in quickly to respond to the queue surge since Ivan 212 and/or the wallboard module 128 gave timely and valuable information to Valentino 112*f*, even during the break. When Valentino 112*f* returns to the workstation, the wallboard 208 may update the display data with current data for the Sales Group, Ivan's message, and Valentino's request.

When Valentino 112*f* logs out, in step 736, and/or exits the facility, the wallboard module 128 may send and the wallboard 208 may display a default data display and/or a data display for the next closest agent 112 is in the facility. The data display may also change when the supervisor Ivan 212 logs out and/or leaves the facility, in step 736. In step 740, the method ends. As new agents 112 and supervisors 212 come onto the contact center floor 204, the method 700 may begin again.

Figure 8:
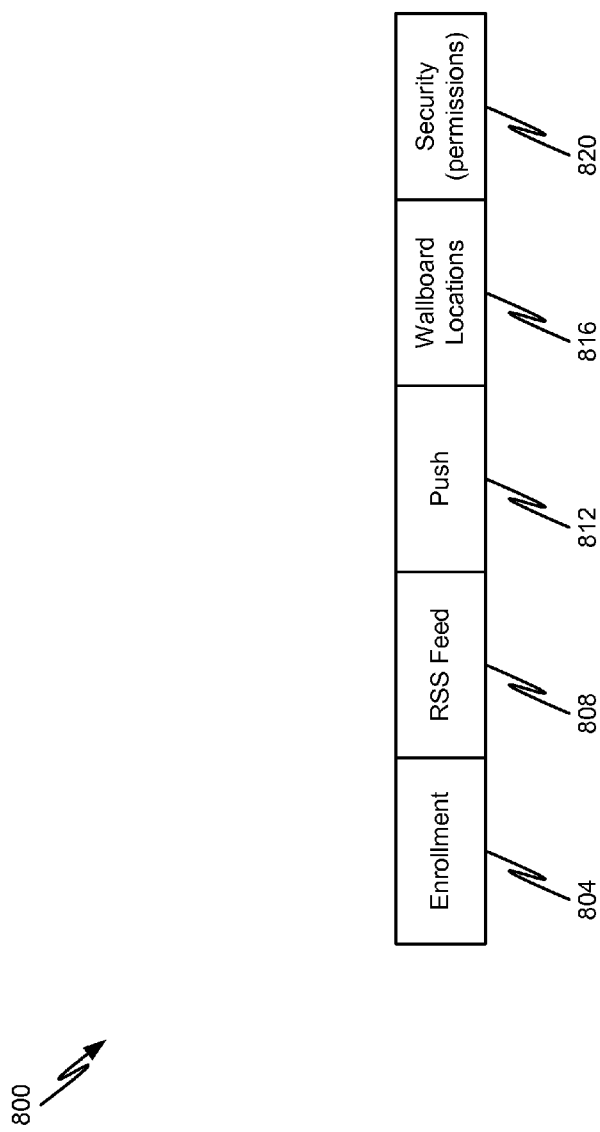
FIG. 8 is a data diagram of data that is used by the features of the wallboard in accordance with embodiments of the present disclosure.

An embodiment of wallboard data 800 is shown in FIG. 8. The phrase "wallboard data," as used herein, refers to a collection of information that may be presented on a wallboard by a wallboard module 128. Wallboard data can include, but is not limited to, enrollment information 804, RSS Feed data 808, push data from a supervisor 212 or other resource 112 with permission 812, information on wallboard physical locations 816, and security data including passwords and permissions 820.

The wallboard data 800 may include specific information from interactions within a contact center 200, a direct feed into the contact center 200 from a CMS, a supervisor 212, or other resources 112 through push, proximity, and/or other system mechanisms. The wallboard data 800 may include metadata. The metadata may include information on resource proximity and/or availability 804. It may also include an RSS Feed 808 that may be associated with statistics and/or metrics for the contact center 200. A database may capture and store any push messages 812 from agents 112 and supervisors 212 with appropriate credentials. The security field 820 can include one or more user names/handles/aliases, login information, contact information, and passwords for accessing the wallboard display.

The stored information may include communication and context information important for human and wallboard interaction. The database information may also include additional agent 112, supervisor 212, and customer information that has been collected in response to multiple interactions with a company or a contact center 200. While there are only five input fields 804, 808, 812, 816, and 820 as shown in FIG. 8, there may be more or fewer data fields associated with data structure 800.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

What is claimed is:

1. A method for interaction with a wallboard, comprising:
obtaining, by a processor, location information for one or more individuals in a contact center;
determining, by the processor, based on the obtained location information, a first wallboard to display contact center information to the one or more individuals that is specifically directed to the one or more individuals, wherein the first wallboard is selected from among a plurality of wallboards in the contact center based on a proximity of the first wallboard with the one or more individuals; and causing, by the processor, the first wallboard to display the contact center information that is specifically directed to the one or more individuals.

2. The method of claim 1, wherein the one or more individuals include a contact center supervisor, the method further comprising:
receiving, by the processor, an instruction from a device carried by the contact center supervisor to update the first wallboard with new contact center information; and
pushing, by the processor, the new contact center information to the first wallboard, thereby causing the first wallboard to display the new contact center information.

3. The method of claim 2, wherein the one or more individuals further include a contact center agent, the method further comprising:
receiving, by the processor, a request from the contact center agent to display the new contact center information;
providing, by the processor, the device carried by the contact center supervisor with a request to display the new contact center information on the first wallboard;
receiving, by the processor, a response to the request granting permission to display the new contact center information on the first wallboard; and
causing, by the processor, the first wallboard to display the new contact center information.

4. The method of claim 1, wherein the contact center information that is displayed on the first wallboard comprises at least one of RSS feed data, contact center performance statistics, contact center metrics, graphs, announcements, alerts, thresholds, and messages.

5. The method of claim 1, further comprising:
identifying, by the processor, a first distance between the first wallboard and the one or more individuals;
identifying, by the processor, a second distance between a second wallboard and the one or more individuals;
determining, by the processor, that the first distance is smaller than the second distance; and
in response to determining that the first distance is smaller than the second distance, identifying, by the processor, the first wallboard as best suited to display the contact center information to the one or more individuals.

6. The method of claim 5, further comprising:
causing, by the processor, the second wallboard to display information that is specifically directed to a second set of individuals and not specifically directed to the one or more individuals, the second set of individuals being closer to the second wallboard than the one or more individuals and the one or more individuals being closer to the first wallboard than the second set of individuals.

7. The method of claim 1, further comprising:
determining, by the processor, that a new agent has logged into the contact center;
determining, by the processor, a distance from the new agent to each wallboard in the contact center;
determining, by the processor, that the new agent is closer to a second wallboard than the first wallboard; and
updating, by the processor, information displayed on the second wallboard to include metrics for the new agent's performance.

8. The method of claim 7, wherein the first wallboard is not updated to display metrics for the new agent's performance.

9. A non-transitory computer-readable medium comprising processor-executable instructions, the instructions, when executed by a processor, cause the processor to perform operations comprising:
obtaining location information for one or more individuals in a contact center;
determining based on the obtained location information, a first wallboard to display contact center information to the one or more individuals that is specifically directed to the one or more individuals, wherein the first wallboard is selected from among a plurality of wallboards in the contact center based on a proximity of the first wallboard with the one or more individuals; and
causing the first wallboard to display the contact center information that is specifically directed to the one or more individuals.

10. The non-transitory computer-readable medium of claim 9, wherein the one or more individuals include a contact center supervisor, the operations further comprising:
receiving an instruction from a device carried by the contact center supervisor to update the first wallboard with new contact center information; and
pushing the new contact center information to the first wallboard, thereby causing the first wallboard to display the new contact center information.

11. The non-transitory computer-readable medium of claim 10, wherein the one or more individuals further include a contact center agent, the operations further comprising:
receiving a request from the contact center agent to display the new contact center information;
providing the device carried by the contact center supervisor with a request to display the new contact center information on the first wallboard;
receiving a response to the request granting permission to display the new contact center information on the first wallboard; and
causing the first wallboard to display the new contact center information.

12. The computer-readable medium of claim 9, wherein the contact center information that is displayed on the first wallboard comprises at least one of RSS feed data, contact center performance statistics, contact center metrics, graphs, announcements, alerts, thresholds, and messages.

13. The non-transitory computer-readable medium of claim 9, the operations further comprising:
identifying a first distance between the first wallboard and the one or more individuals and identifying a second distance between a second wallboard and the one or more individuals;
determining that the first distance is smaller than the second distance; and
identifying the first wallboard, in response to determining that the first distance is smaller than the second distance, as best suited to display the contact center information to the one or more individuals.

14. The non-transitory computer-readable medium of claim 13, the operations further comprising:
causing the second wallboard to display information that is specifically directed to a second set of individuals and not specifically directed to the one or more individuals, the second set of individuals being closer to the second wallboard than the one or more individuals and the one or more individuals being closer to the first wallboard than the second set of individuals.

15. The non-transitory computer-readable medium of claim 9, the operations further comprising:

determining that a new agent has logged into the contact center;

determining a distance from the new agent to each wallboard in the contact center;

determining that the new agent is closer to a second wallboard than the first wallboard; and updating information displayed on the second wallboard to include metrics for the new agents performance.

16. The computer-readable medium of claim 15, wherein the first wallboard is not updated to display metrics for the new agent's performance.

17. A communication system, comprising:

a plurality of wallboards; and a wallboard module comprising a processor and processor-executable instructions that enable the processor of the wallboard module to perform the following operations:

obtain, using the processor, location information for one or more individuals in a contact center:

determine, using the processor and based on the obtained location information, a first wallboard to display contact center information to the one or more individuals that is specifically directed to the one or more individuals and cause the first wallboard to display the contact center information that is specifically directed to the one or more individuals, wherein the first wallboard is selected from among the plurality of wallboards in the contact center based on a proximity of the first wallboard with the one or more individuals;

receive, using the processor, an instruction from a device carried by the contact center supervisor to update the first wallboard with new contact center information and push the new contact center information to the first wallboard, thereby causing the first wallboard to display the new contact center information;

receive, using the processor, a request from the contact center agent to display the new contact center information and provide the device carried by the contact center supervisor with a request to display the new contact center information on the first wallboard; and receive, using the processor, a response to the request granting permission to display the new contact center information on the first wallboard and cause the first wallboard to display the new contact center information.

18. The system of claim 17, wherein the processor-executable instructions of the wallboard module further enable the processor to perform the following operations:

identify a first distance between the first wallboard and the one or more individuals and a second distance between a second wallboard and the one or more individuals;

determine that the first distance is smaller than the second distance;

in response to determining that the first distance is smaller than the second distance, identify the first wallboard as best suited to display the contact center information to the one or more individuals; and cause the second wallboard to display information that is specifically directed to a second set of individuals and not specifically directed to the one or more individuals, the second set of individuals being closer to the second wallboard than the one or more individuals and the one or more individuals being closer to the first wallboard than the second set of individuals.

19. The system of claim 18, wherein the processor-executable instructions of the wallboard module further enable the processor to perform the following operations:

determine that a new agent has logged into the contact center;

determine a distance from the new agent to each wallboard in the contact center;

determine that the new agent is closer to a second wallboard than the first wallboard; and update information displayed on the second wallboard to include metrics for the new agent's performance.

20. The system of claim 17, wherein the device comprises at least one of a personal computer, laptop, tablet, cellular phone, smartphone, and telephone.

* * * * *